(12) United States Patent
Bates et al.

(10) Patent No.: US 6,643,824 B1
(45) Date of Patent: Nov. 4, 2003

(54) TOUCH SCREEN REGION ASSIST FOR HYPERTEXT LINKS

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,027

(22) Filed: Jan. 15, 1999

(51) Int. Cl.[7] .............................................. G06F 17/00
(52) U.S. Cl. ................................ 715/501.1; 345/760
(58) Field of Search ............................ 707/501.1, 513, 707/500.1; 345/157, 760, 784, 786, 787; 709/203, 217–219; 715/501.1, 500.1, 513

(56) References Cited

U.S. PATENT DOCUMENTS

| | | | | |
|---|---|---|---|---|
| 4,698,625 A | * | 10/1987 | McCaskill et al. | 340/709 |
| 4,803,474 A | | 2/1989 | Kulp | 340/709 |
| 5,204,947 A | | 4/1993 | Bernstein et al. | 395/157 |
| 5,565,888 A | * | 10/1996 | Selker | 345/146 |
| 5,680,562 A | | 10/1997 | Conrad et al. | 395/342 |
| 5,736,974 A | | 4/1998 | Selker | 345/146 |
| 5,736,985 A | | 4/1998 | Lection et al. | 395/354 |
| 5,745,100 A | | 4/1998 | Bates et al. | 345/157 |
| 5,790,122 A | * | 8/1998 | Cecchini et al. | 345/357 |
| 5,802,299 A | | 9/1998 | Logan et al. | 395/200.48 |
| 5,806,077 A | | 9/1998 | Wecker | 707/501 |
| 5,808,601 A | | 9/1998 | Leah et al. | 345/145 |
| 5,809,317 A | | 9/1998 | Kogan et al. | 395/762 |
| 5,844,557 A | | 12/1998 | Shively, II | 345/339 |
| 5,877,766 A | | 3/1999 | Bates et al. | 345/357 |
| 5,878,223 A | | 3/1999 | Becker et al. | 395/200.53 |
| 5,905,991 A | | 5/1999 | Reynolds | 707/501 |
| 5,937,417 A | | 8/1999 | Nielsen | 707/513 |
| 5,956,025 A | | 9/1999 | Goulden et al. | 345/327 |
| 6,049,326 A | * | 4/2000 | Beyda et al. | 345/157 |
| 6,075,537 A | * | 6/2000 | Adapathya et al. | 345/760 |
| 6,178,432 B1 | * | 1/2001 | Cook et al. | 707/513 |
| 6,266,681 B1 | * | 7/2001 | Guthrie | 707/501 |
| 6,373,502 B1 | * | 4/2002 | Nielsen | 345/708 |
| 6,374,272 B2 | * | 4/2002 | Bates et al. | 345/156 |
| 6,405,238 B1 | * | 6/2002 | Votipka | 709/203 |

FOREIGN PATENT DOCUMENTS

| | | |
|---|---|---|
| EP | 0918277 A2 | 5/1999 |
| GB | 2336226 A | 10/1999 |
| JP | 028193 | 2/1993 |
| JP | 244856 | 9/1997 |

OTHER PUBLICATIONS

Dick Oliver et al., "Netscape Navigator 3 Unleashed, 2d ed", Sams.net Publishing, 1996, pp. 4, 5, 18, 19, 899–902.*
Screen dumps from www.realtor.com, Dec. 23, 1996 (waybackmachine www.archive.org).*

* cited by examiner

*Primary Examiner*—Joseph H. Feild
(74) *Attorney, Agent, or Firm*—Wood, Herron & Evans LLP (57) ABSTRACT

A method, computer system, program product is provided for enhancing interaction with a hypertext document rendered by a browser on a touch screen. A navigation button is displayed corresponding to a displayed link in response to a predetermined event, such as changing the displayed portion of a hypertext document or touching the screen, especially if outside of all displayed links. When a plurality of links are present, prioritization of navigation buttons displayed is contemplated, based on those closest to the area touched and on a maximum allowable number of navigation buttons.

22 Claims, 7 Drawing Sheets

TOUCH SCREEN REGION ASSIST FOR HYPERTEXT LINKS

FIELD OF THE INVENTION

The invention is generally related to computers and computer software. More specifically, the invention is generally related to a manner of interfacing with user interface controls displayed on a computer display.

BACKGROUND OF THE INVENTION

Hypertext linking has become an extremely popular manner of interfacing with a computer due to its intuitiveness, simplicity and efficiency. With hypertext linking, a user is permitted to navigate between documents and/or between different locations in the same document simply by moving a pointer over a hypertext link and selecting the hypertext link by depressing a key or button (a process known as "pointing and clicking").

Hypertext links often include text embedded within a text string that is highlighted to identify the text as a hypertext link. As such, a user is often able to navigate by directly selecting the text from a portion of a text string. For example, a text string such as "the winner of the 1973 Kentucky Derby was Secretariat" might have a hypertext link defined for the word "Secretariat," such that a user might be able to view a separate document with Secretariat's career racing statistics simply by pointing and clicking on the word "Secretariat."

A principal use of hypertext linking is in retrieving information from the Internet, and specifically, a portion of the Internet known as the World Wide Web ("the Web"). Moreover, due to the ever-increasing popularity of the Web, many private networks, as well as other applications local to a users workstation, now use hypertext linking to access and navigate between documents. Documents are typically formatted using a standard language known as the Hypertext Markup Language (HTML), and are viewed using a computer software application known as a web or hypertext browser. Browsers typically display all or a portion of a particular document in one or more graphical windows.

Typical browsers and hypertext documents viewed on browsers are generally optimized for hand manipulated pointing devices, e.g., trackballs, touch pads, mice, etc. These pointing devices generally have two attributes: (1) feedback to the user as to current position of a cursor controlled by the pointing device; and (2) discrete selection of a coordinate on the display. In other words, the user can reposition the cursor until the cursor exactly points to a display object of interest. Selecting the object by clicking a button on the pointing device corresponds to a very specific point.

The typical hypertext document is designed for the screen size and resolution of a typical desktop or laptop computer with the density of links displayed presupposing the accuracy of typical pointing devices. Users encounter problems interacting with hypertext documents, however, due to various limitations. Human error, poor vision or poor coordination makes selecting links problematic on a browser rendered hypertext document The computer system may include a small display or an overly-sensitive pointing device, for example, that complicates selecting links. In addition, some hypertext documents are poorly designed by having very small links placed close to one another that are inherently difficult to select.

Selecting the wrong link or missing all of the links is a problem because it delays and frustrates the user. Due to the time often required to navigate to a link, the user may be unaware of the error for a period of time. Then the user has to retrace his steps, going back to the original portion of the hypertext document and trying again. The user may repeatedly miss the desired link if the human, system or document design limitations are severe.

These difficulties in selecting hypertext links are even more pronounced for touch screen pointing devices incorporated into computer displays, thus making hypertext navigation difficult. Small touch screens, such as on a palm-type computer, make the links appear small and difficult to select. On touch screens such as kiosks, even though the screen may be large, the user may have difficulty selecting links. The typically thick glass of the display and orientation of the display can induce a parallax effect, with the link appearing offset. Also, the user may be less familiar with such interfaces, increasing human error. In addition, some touch screens process the touched area input by selecting a single coordinate to represent the input. This approximation introduces an error when the user overlaps the desired area but the computer system treats the input as a coordinate outside the desired area Other types of user input devices may also introduce errors that make it difficult to accurately select hypertext links. For example, some touch screens are implemented using infrared sensors oriented a short distance in front of a conventional display screen. Also, some virtual reality interfaces, for example, utilize instrumented gloves or other three-dimensional pointing devices to position a pointer within a three-dimensional space. In each case, factors such as human error and parallax effects can adversely affect pointing accuracy.

Efficient navigation of hypertext document by accurately selecting hypertext links is of growing importance as this form of navigation becomes pervasive. Current operating systems, such as Windows 98, for example, integrate the browser intimately. Thus, finding and viewing locally stored documents may be done in a browser environment. In addition, applications, such as many word processors, allow simplified creation of hypertext documents. Thus, users may have increasing amounts of browser navigable content available. Also, commerce and communication is being done increasingly on the Internet, making efficient navigation on hypertext documents critical. Moreover, many portable digital communication devices are incorporating limited browsing capabilities.

Existing alternatives for accurately selecting links, especially on touch screens or on devices that employ other similar "coarse" pointing devices, are inadequate. Increasing the size of the portion displayed would make selecting a hypertext link easier; however, this option is generally not preferred or available. First, the browser and computer operator system may make increasing the size difficult. Second, the hypertext document may be rendered difficult to use if forced to focus on very small portions. Scrolling back and forth may be insufficient for viewing sections meant to be viewed in their entirety. Substituting other, more accurate pointing devices may also be inappropriate in many instances, e.g., in a consumer kiosk where user simplicity is preferred, or in a palm-type computer where size and portability are paramount concerns.

Therefore, a significant need continues to exist for a manner of simplifying the selection of user interface controls, and in particular, the selection of hypertext links, with a touch screen or similar pointing device.

SUMMARY OF THE INVENTION

The invention addresses these and other problems associated with the prior art by providing a computer system, program product and method in which a supplemental input region is displayed in response to displaying a primary input region for a hypertext link, This supplemental input region may comprise a navigable button appropriately sized and referenced to the print input region to make selection with a touch screen input easier.

In addition, with some embodiments of the invention, this displaying of the supplemental input region may be triggered by a predetermined event. One such trigger could be the user selecting a portion of the display outside of any primary input region for a hypertext link. Another such trigger could be selecting a portion of the display that is within two primary input regions, especially for touch screen pointing devices that provide a plurality of input coordinates to the browser in response to user input. In yet another, the trigger could be selecting any portion of the screen, even if solely within one primary input region, especially if the browser is configured to avoid inadvertent selection of a hypertext link by requiring more than one screen touch. Also, the predetermined event could be user selection of a control such as a dedicated browser button, or pop-up or pulldown menu item. Further, selecting another portion of a hypertext document or a different hypertext document to view could be the predetermined event.

Without limiting the invention to a particular implementation, it may be desirable in some embodiments to visually associate a pair of primary and supplemental input regions by color or patterns, especially if such association would be discernable on a monochrome screen as well as color screen.

In some embodiments consistent with the invention, the supplemental input regions are in the form of navigable buttons. A first illustrative embodiment places navigable buttons in a row at the edge of the displayed portion of the hypertext document. Alternatively, the buttons could be floating adjacent to their corresponding primary input region or link, perhaps opaque so that overlapped hypertext document content would be visible. As yet another alternative, the buttons could be inserted into a local copy of the hypertext document and the document repaginated so that the buttons do not overlap content in the hypertext document. Other alternatives will be apparent to one of ordinary skill in the art.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described various embodiments of the invention.

DETAILED DESCRIPTION

Hardware Environment

Figure 1:
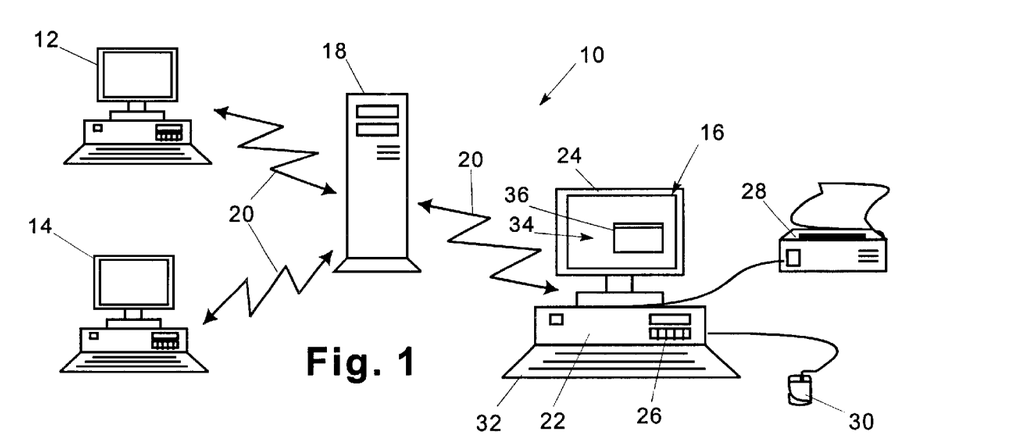
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 16 (e.g., desktop or personal computers, workstations, etc.) coupled to server system 18 through a network 20. Network 20 may represent practically any type of networked interconnection, including but not limited to local-area, wide-area, wireless, and public networks (e.g., the Internet). Moreover, any number of computers and other devices may be networked through network 20, e.g., multiple servers. Furthermore, it should be appreciated that the principles of the invention may be utilized as well by standalone computers and associated devices consistent with the invention.

Computer system 16, which may be similar to computer systems 12, 14, may include one or more processors 22 such as a microprocessor, a number of peripheral components such as a computer display 24 (e.g., a CRT, an LCD display or other display device); mass storage devices 26 such as hard, floppy, and/or CD-ROM disk drives; a printer 28; and various user input devices (e.g., a mouse 30, keyboard 32, and touch screen 34), among others. Computer system 16 operates under the control of an operating system and executes various computer software applications, programs, objects, modules, etc. (e.g., a browser 36) as is well known in the art. Moreover, various applications, programs, objects, modules, etc. may also execute on one or more processors in server 18 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs" or "programs." The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution, Examples of signal bearing media include but are not limited to recordable type media such as volatile and nonvolatile memory devices, floppy disks, hard disk drives, CD-ROMs, DVDs, and transmission type media such as digital and analog communications links.

Those skilled in the art will recognize that the exemplary environment illustrated in FIG. 1 is not intended to limit the present invention. Indeed, those skilled in the art will recognize hat other alternative hardware environments may be used without departing from the scope of the present invention.

Software Environment

Figure 2:
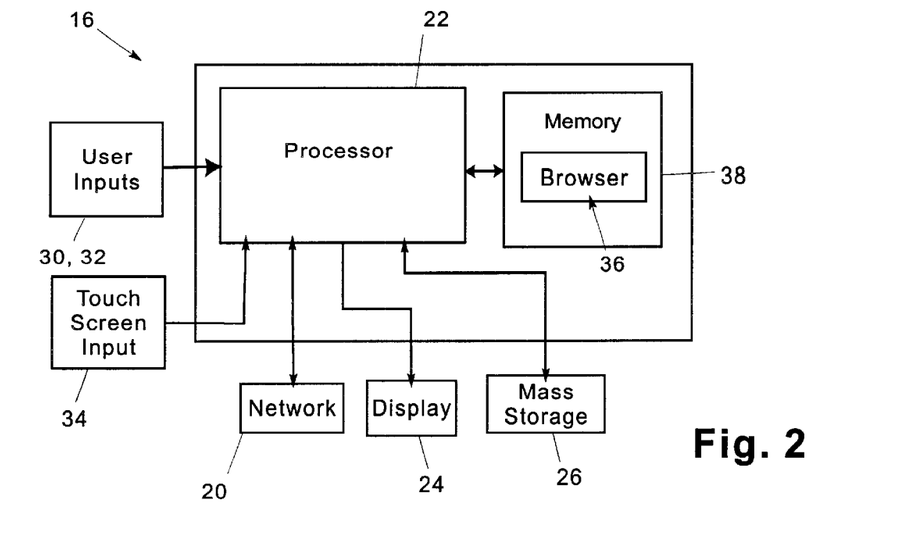
FIG. 2 is a block diagram of an exemplary software environment for the computer system of FIG. 1.

FIG. 2 illustrates one suitable software environment for computer system 16 consistent with the invention. A processor 22 is illustrated as coupled to a memory 38 as well as to several inputs and outputs. For example, user input is received by processor 22, e.g., by mouse 30 and keyboard 32, among others, Other suitable user interface devices may include, for example, a remote control, a trackball, a joystick, a touch pad, and an Accupoint input device. Among others of particular interest to the present invention are inputs to a touch screen 34, especially when the touch screen 34 is the only pointing device. Additional information may be stored to and/or received from mass storage 26. Processor 22 also outputs display data to display 24. It should be appreciated that computer system 16 includes suitable interfaces between processor 22 and each of components 20, 24, 26, 30, 32, and 38 as is well known in the art.

An exemplary embodiment of the invention is implemented within a hypertext (or web) browser application 36, e.g., similar to the Internet Explorer browser from Microsoft Corporation and the Navigator browser from Netscape Communications. It should be appreciated, however, that the invention may also be implemented in other applications that utilize user interface controls, and specifically hypertext links, as well as directly within the operating system or other support software of a computer system consistent with the invention.

Browser 36 is illustrated in FIG. 2 as being resident in memory 38. However, it should be appreciated that various components of the application may be stored on network 20 or mass storage 26 prior to start-up, and in addition, that various components may be resident at different ties in any of memory 38, mass storage 26, network 20, or within registers and/or caches in processor 22.

It should also be appreciated that other software environments may be utilized in the alternative.

Region Assist for Hypertext Links

A browser 36 generally renders hypertext documents for display. Codes within the hypertext document typically provide for (1) placement or other display attributes for content in the first hypertext document; (2) inbound links for bringing in objects such as other hypertext documents to be displayed with content in the first hypertext document; and (3) out-bound links for navigating from the first hypertext document to another hypertext document.

The exemplary embodiments of the invention generally operate by enhancing a user's ability to act upon an outbound link by providing a supplemental input region in addition to the primary input region typically rendered by browser 36. Selecting or activating the supplemental input region performs the same function as acting upon the primary input region. In the illustrative embodiment this supplemental input region has a display representation as a navigable button.

The way in which conventional browsers render hypertext documents and especially their links is of importance to the present invention. First, the way hypertext documents could be designed so that touch screen inputs could lead to ambiguous inputs (i.e., not selecting one and only one link) or prone to error (e.g., the browser resolves a touch screen input to an unintended coordinate). Second, some of the embodiments consistent with the invention associate the supplemental input region with the primary input region by similar display characteristics such as color and placement.

A primary input region for a hypertext link is used to receive input for selecting the link for further browser actions such as viewing property information, or navigating to a hypertext document referenced by the link. Typically, the primary input region of a hypertext link includes the extent of the actual text and/or image data forming the display representation of the hypertext link. While the invention is not limited to a specific hypertext link format, one particularly useful application of the invention is in conjunction with hypertext links defined in an HTML document such as an Internet document. Principally three types of hypertext links are defined by the HTML protocol. A first type of hypertext link is defined by a text string including a plurality of alphanumeric characters that are typically highlighted (e.g., through underlining and a unique color) to set the characters off from surrounding text, whereby the primary input region thereof is the boundary of the display representation of the text string. A second type of hypertext link is defined by a graphical image having a border that defines the input region thereof. Yet another type of hypertext link is defined by a predetermined input region specified within an image map. In this latter type of hypertext link, multiple links may be defined in a common graphical image by defining coordinates, and optionally, a shape (e.g., a rectangle, a circle or a polygon) within the graphical image. With this latter type, the input region is coextensive with the boundary defined in the definition of the image map. A primary input region for a hypertext link thus is typically, but not necessarily, coextensive with a display region of the display representation of the link.

A supplemental input region, like a primary input region, also receives input to select a hypertext link associated therewith However, a supplemental input region is visually distinct from, and often separated from, both the primary input region and the display region of the hypertext link. As discussed above, a supplemental input region may be visually represented as a navigable button, although other representations may also be used.

Figure 3:
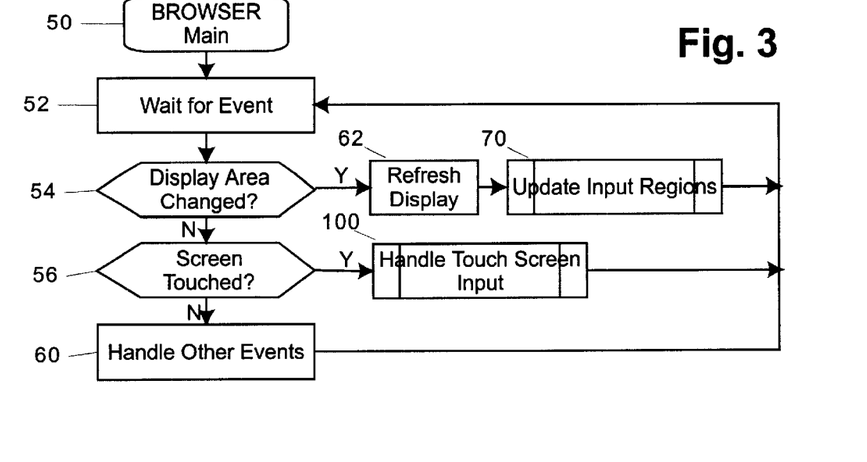
FIG. 3 is a flowchart illustrating the program flow for the main routine of the browser of FIG. 2.

FIG. 3 illustrates an exemplary program flow for a main routine 50 executed by browser application 30 of FIG. 2. Routine 50 is shown implemented in an event-driven representation. However, other programming models, e.g., procedural, may be used in the alternative.

Routine 50 generally operates in an endless loop that waits for events at block 52, checks for certain specified events, processes those events, and returns to block 52 to wait for additional events. A number of events generally related to the use of a touch screen consistent with the invention are illustrated at blocks 54 and 56. Additional events conventionally handled by a browser application, but which are not relevant to an understanding of the invention, are handled in a conventional manner in block 60.

One event handled by routine 50 is a refresh display event, which is detected at block 54. This event may be initiated in any number of circumstances, e.g., whenever the browser wishes to generate a new document that has been retrieved via a hypertext link, when a user has scrolled up or down in a document, or in response to a specific command to refresh the display, among other operations.

The refresh display event is handled in block 62 by refreshing the display, a process that is well known in the art Generally, refreshing the display encompasses rendering the source HTML information from a document into a display representation generated via the control tags embedded in the HTML document.

Once the display is refreshed, an update input regions routine 70 (discussed below) is called to build a list of input regions for the various hypertext links defined in the currently-displayed HTML document.

Another event handled by browser 30 is a screen-touched event, which is detected at block 56 and handle touch screen input routine 100. This input includes a discrete spatial area at a specific time interval.

Figure 4:
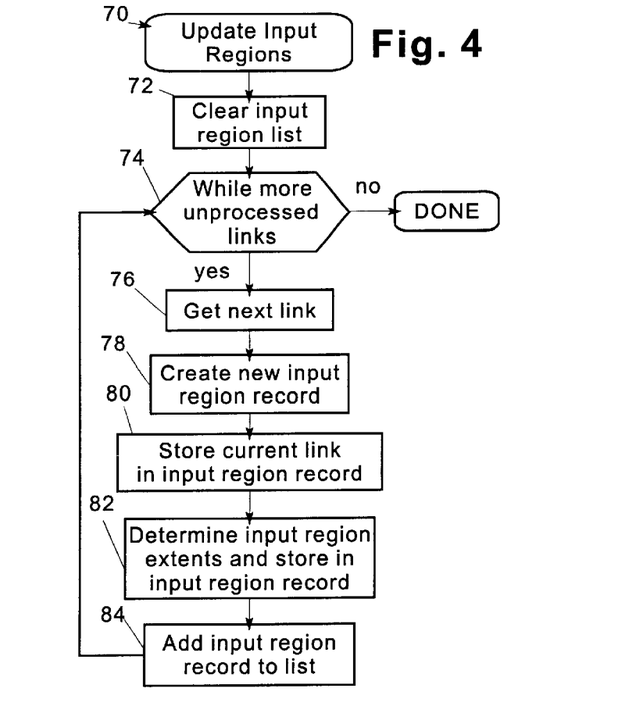
FIG. 4 is a flowchart illustrating the program flow of the update input regions routine of FIG. 3.

FIG. 4 illustrates update regions routine 70 in greater detail. Routine 70 begins in block 72 by clearing an input region data structure, e.g., by deallocating the space reserved for such a structure, or other manners known in the art.

Figure 5:
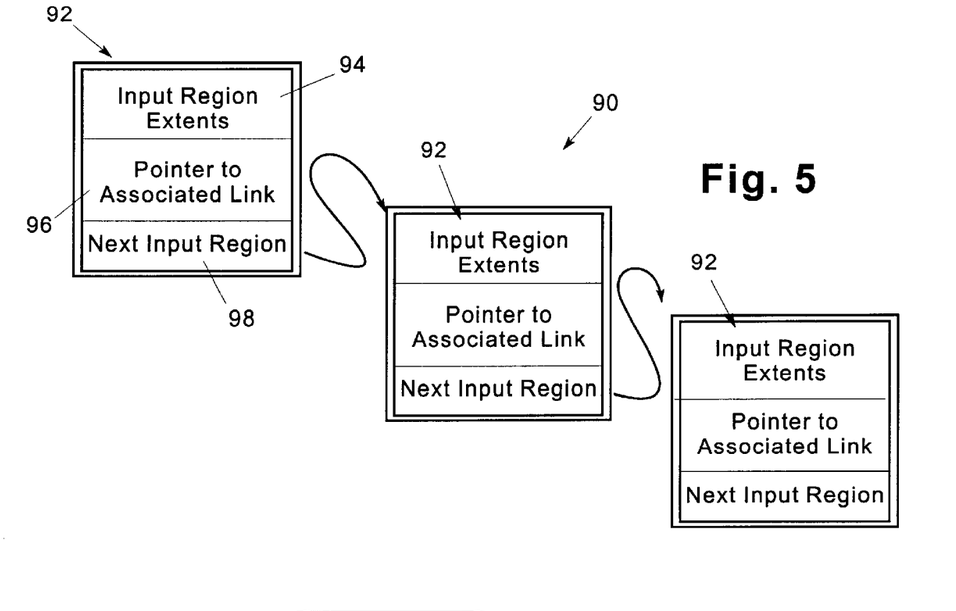
FIG. 5 is a block diagram of an input region list data structure consistent with the invention.

Any number of data structures may be utilized to store input region information for a plurality of hypertext links defined within a hypertext document. For example, FIG. 5 illustrates a linked list data structure 90 including a plurality of records 92, each of which is assigned to a particular hypertext link defined in a hypertext document. Each record 92 includes a field 94 within which is stored the extents of the input region. The extents may be defined, for example, by coordinates, by shape and/or by a combination thereof. Moreover, the extents may be defined in absolute coordinates or in relative coordinates (e.g., relative to the coordinates of the display region of a particular hypertext link definition).

Each record 92 also includes a field 96 including a pointer to the associated link for the record. This permits quick access to the link to be activated in response to a user operation performed while the pointer is disposed within an input region.

Each record 92 also includes a field 98 including a pointer to the next input region within the linked list data structure 90. The end of the linked list is determined by a record 92 having a NULL pointer stored in field 98.

It should be appreciated that other data structures may be used consistent with the invention.

Returning to FIG. 4, once the input region list is cleared, control passes to block 74 to initiate a WHILE loop that is executed until each hypertext link within the current document, or displayed portion of the current document, has been processed. As long as additional unprocessed links exist, control passes to block 76 to retrieve the next hypertext link. Next, in block 78 a new input region record 92 is created, e.g., by creating a new input region object. Next, in block 80 a pointer to the current link being processed is stored in field 96 of the new input region record 92. In the alternative, the actual URL or other address information may be stored directly in the field.

Next, in block 82, the extents of the input region are determined and stored in field 94 of the new input region record 92. Determination of the input region may be performed in a number of manners based upon the shape and relative or absolute coordinates utilized to define an input region For example, for an alphanumeric hypertext link, one suitable manner of defining the input region may be to determine the leftmost, rightmost, topmost and bottommost coordinates of the display region of the hypertext link, and then adjust these values by a predetermined amount in each direction to define an input region that extends in all directions a predetermined amount beyond the display region.

Once the input region extents are stored in record 92, the new record is added to the input region data structure 90 in block 84, typically by locating the last record in the list and setting the next input region field 98 thereof to point to the new record. Upon completion of block 84, control returns to block 74 to process additional links in the document until all such links have been processed, whereby routine 70 is then terminated.

Figure 6:
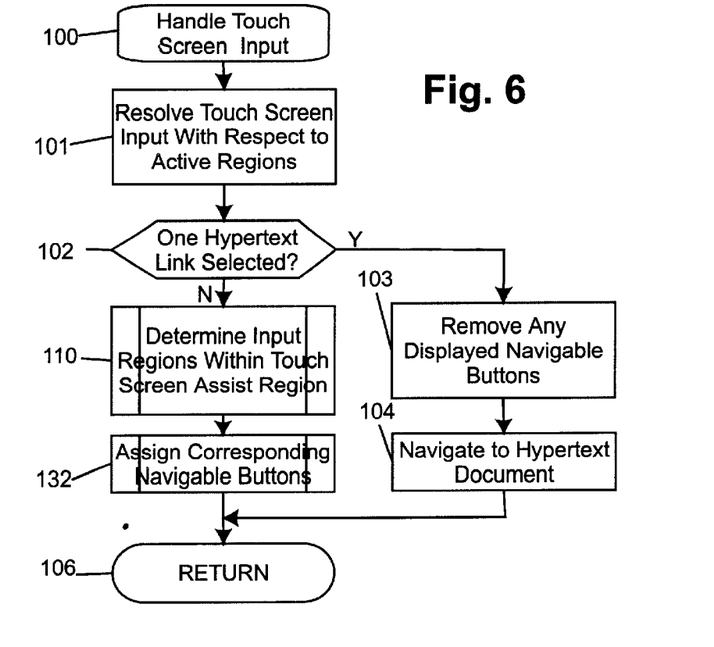
FIG. 6 is a flowchart illustrating the program flow of the handle touch screen input routine of FIG. 3.

Referring to FIG. 6, the handle touch screen input routine 100, mentioned in FIG. 3, is illustrated. First, the touch screen input is resolved with respect to active regions (block 101). Many operating systems such as the Microsoft Windows 3.1, 95, 98, etc., have a graphical user interface wherein various areas of the screen activate different objects. Assuming that the touch screen input is directed to a display for the browser routine 50, block 101 compares the touch screen input to all active input regions, including all primary input regions and any supplemental input regions that may have been previously displayed. Generally, input regions are mutually exclusive and touch screen pointing devices return a single coordinate, so determining what input region, if any, is designated is straight-forward. However, for touch screen pointing devices that return a plurality of coordinates, such as the entire area touched, block 101 could determine that the touch screen input is within a plurality of input regions.

Block 102 determines whether the touch screen input specifies one input region that is for a hypertext link (either a primary or a supplemental input region). If so, the browser 36 removes any displayed navigable buttons (i.e., any previously displayed supplemental input regions) (block 103), navigates to the hypertext document (block 104), and routine 100 is complete (lock 106). If not, however, then the primary input regions within a touch screen assist region are determined (block 110), and are each assigned to a corresponding navigable button (block 132), and routine 100 is done (block 106).

Alternatively, the determination of whether one hypertext link was selected in block 102 may be replaced with a determination of whether one navigable button (supplemental input region) was selected. Thus, the touch screen region assist would be made the only method of navigating to the desired hypertext link. In yet another embodiment, the determination in block 102 may be that two or more links are close enough to the region touched that an ambiguity exists. If no ambiguity, then processing proceeds to block 103. These embodiments would mitigate inadvertent actuation due to parallax or user error.

Figure 7:
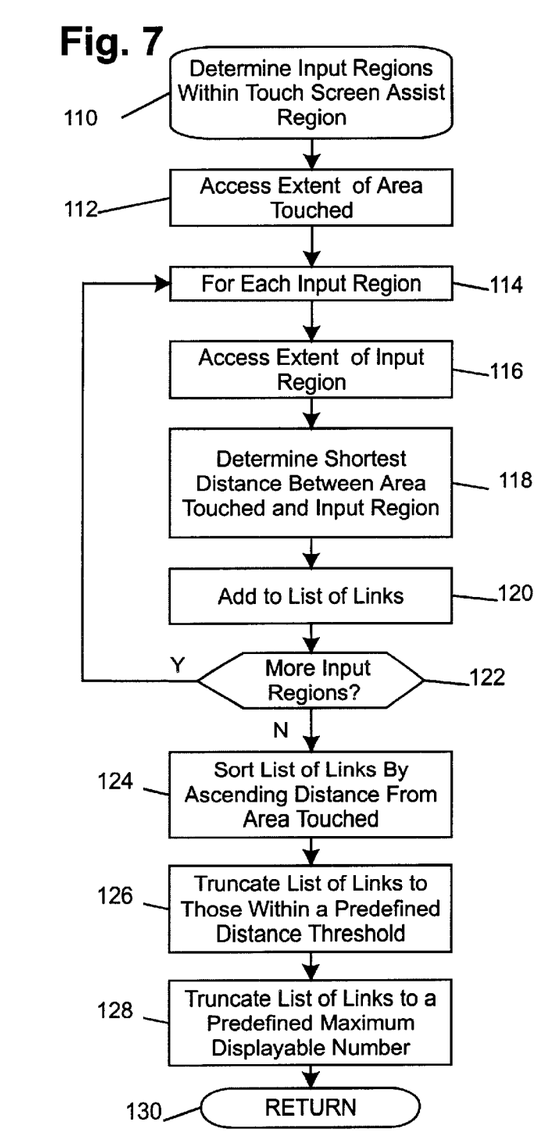
FIG. 7 is a flowchart illustrating the program flow of the determine input regions within touch screen assist region routine of FIG. 6.

Referring to FIG. 7, the determine input regions within a touch screen assist region, mentioned in FIG. 6, is illustrated. This illustrative embodiment determines a list of links to be displayed as a function of distance from the touch screen input and the maximum displayable number of supplemental input regions. First, the extent of the area touched is accessed (block 112). Then, for each primary input region displayed (block 114), the distance is calculated to the area touched by accessing the extent of the primary input region (block 116), determining the shortest distance to the area touched (block 118), and adding the distance information to a list of links (block 120), and returning at block 122 for any additional primary input regions.

Once all of the distances have been calculated, the list of links are sorted by increasing distance (block 124) and the list is truncated to those within a predefined distance threshold (block 126), This threshold could encompass all links displayed or be set to a small radius. Then, the list may be further truncated by a maximum number of displayable supplemental input links (block 128), and routine 110 returns (block 130).

Figure 8:
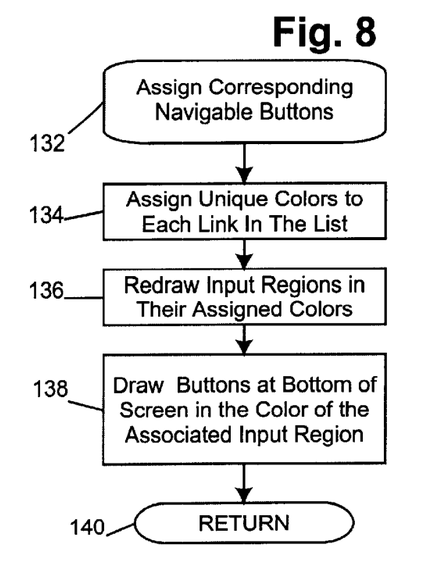
FIG. 8 is a flowchart illustrating the program flow of the assign corresponding navigable button routine of FIG. 6.

Referring to FIG. 8, the assign corresponding navigable buttons routine 132, mentioned in FIG. 6, is illustrated. First, unique colors are assigned to each primary input region (block 134). The colors ideally would have a different gray tone when displayed on a monochromatic display or when viewed by a color blind person. Alternatively, a different shading pattern could be utilized to differentiate on monochromatic displays. Next the primary input regions are redrawn in their assigned colors (block 136). For hypertext links, the font color and underline color would be switched to the assigned color. For geographic shapes, the outline or other portions of the shape would be changed to the assigned color. Then supplemental input regions in the form of navigable buttons are drawn along the bottom of the screen in the color assigned to the associated primary input region (block 138) and routine 132 is done (block 140).

Figure 9:
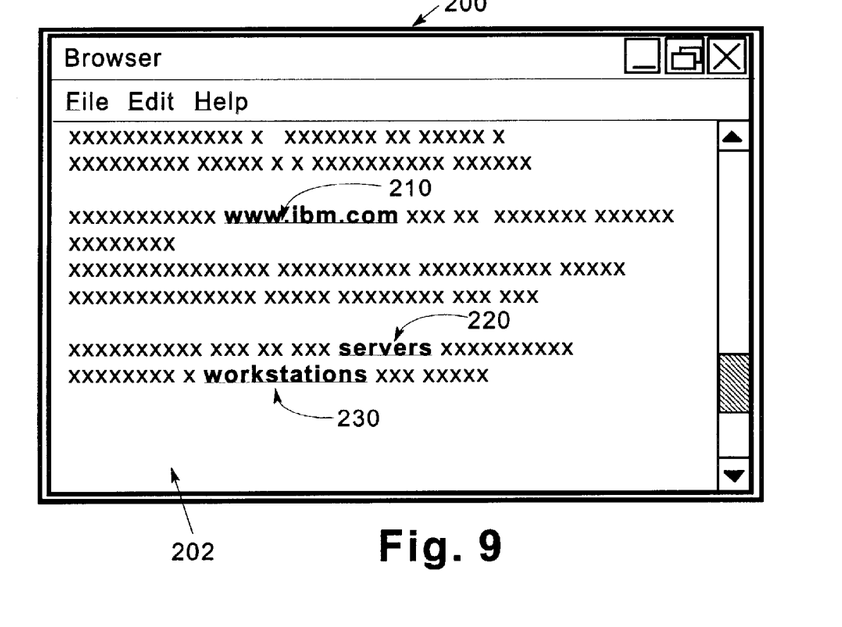
FIG. 9 is a block diagram illustrating an exemplary hypertext document displayed in a window on the computer system of FIG. 1.

As an illustrative example of tie operation of browser 36, a display representation 200, having displayed therein a hypertext document 202, is presented in FIG. 9. Three hypertext links 210, 220, 230 are shown displayed with hypertext document 202.

Figure 10:
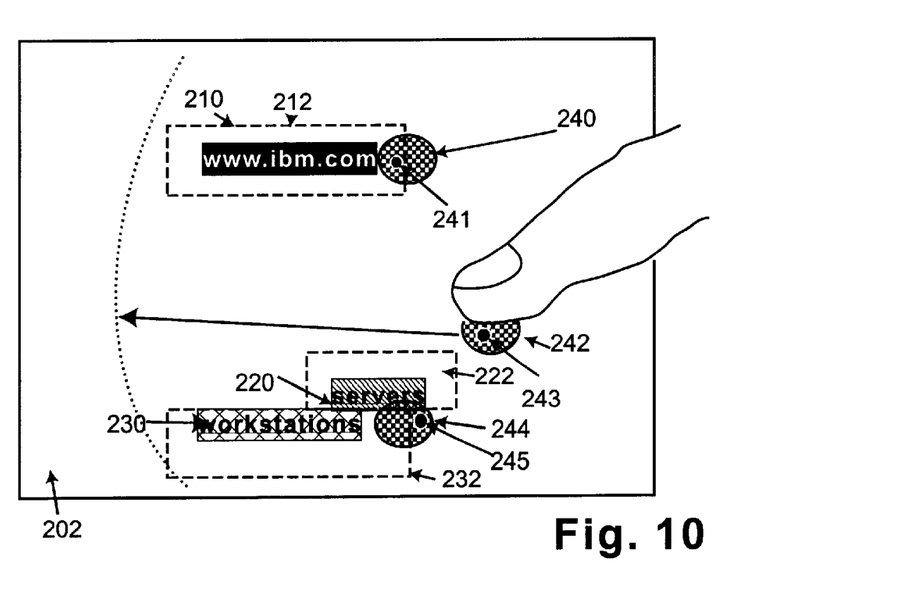
FIG. 10 is a simplified block diagram of the hypertext document of FIG. 9, with a user selecting a portion of the document.

Next, as shown in FIG. 10, a simplified depiction of these three hypertext links 210, 220, 230, each having a primary input region 212, 222, 232 respectively, is shown along with illustrative touch inputs 240, 242, 244. Each touch screen input 240, 242, 244 may be converted by the touch screen 34 into a single coordinate input 241, 243, 245 receptively. Touch screen But 240 would be an unambiguous selection of one hypertext link 210. Touch screen input 242 would be a selection outside of all primary input regions. Touch screen input 244 would be a selection which is within two primary input regions due to the coarseness of the touch screen input capability. Moreover, the touch screen 34 could assign one coordinate input 245 that fell within primary input region 232 or primary input region 222 rather than outside of both regions as depicted.

Figure 11:
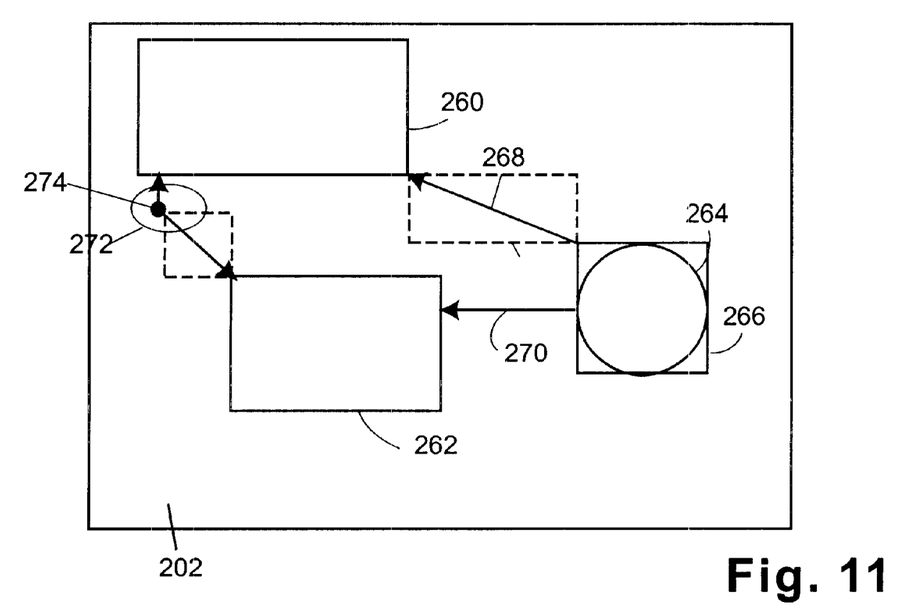
FIG. 11 is a depiction of the determination of distance between the area touched and the primary input region of FIG. 7.
Figure 12:
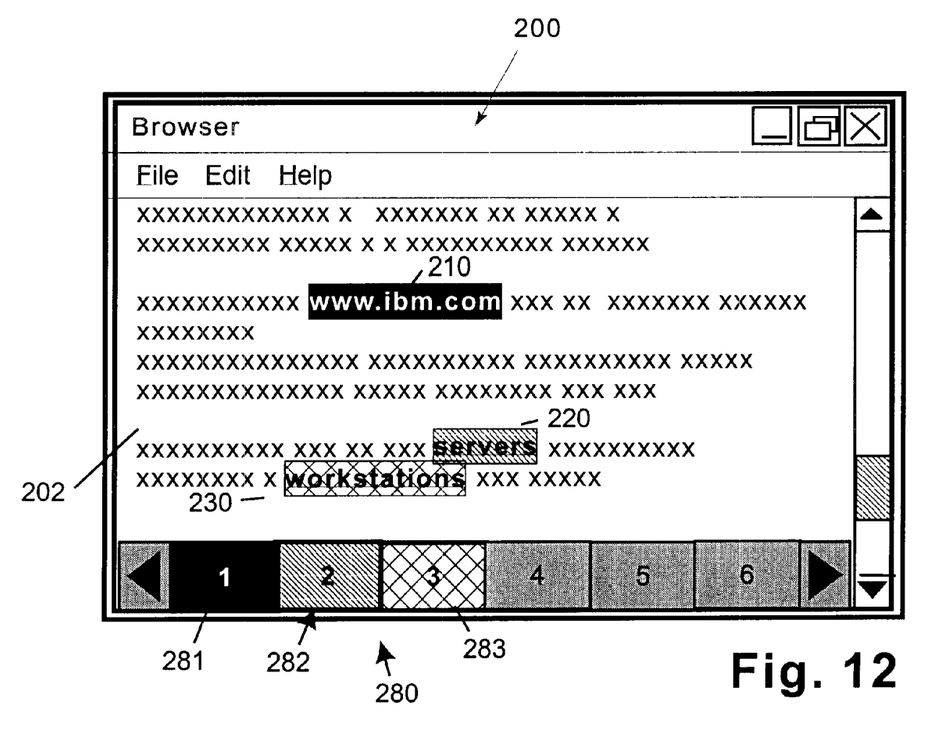
FIG. 12 is a block diagram illustrating a first exemplary hypertext document displayed in a window on the computer system of FIG. 1 after touch screen assist has modified the display.

Referring to FIG. 11, the determination of the shortest distance between the area touched and the primary input region (block 118), mentioned for FIG. 7, is depicted in several variations. Two primary input regions 260, 262 are shown. A first touched area input 264 is shown for embodiments in which the touch screen input is a plurality of coordinates. One way of determining distance 268 to input region 260 and distance 270 to input region 262 is facilitated by approximating this input 264 by a square touch region 266. The second touched area input 272 corresponds to the general situation in which the browser is provided a coordinate input 274 from which to determine distance, even if the original user input was an area Referring to FIG. 12, a first illustrative embodiment is shown of displaying navigable buttons 280 in a row along the bottom of display window 200. These buttons 280 could be hidden or inoperative and gray prior to touch screen region assist activation. As shown, a first navigable button 281 is colored to match the first hypertext link 210. A second navigable button 282 matches the second hypertext link 220. A third navigable button 283 matches the third hypertext link 230. The user can therefore select from the more friendly and unambiguous buttons 280 to take the desired link.

Figure 13:
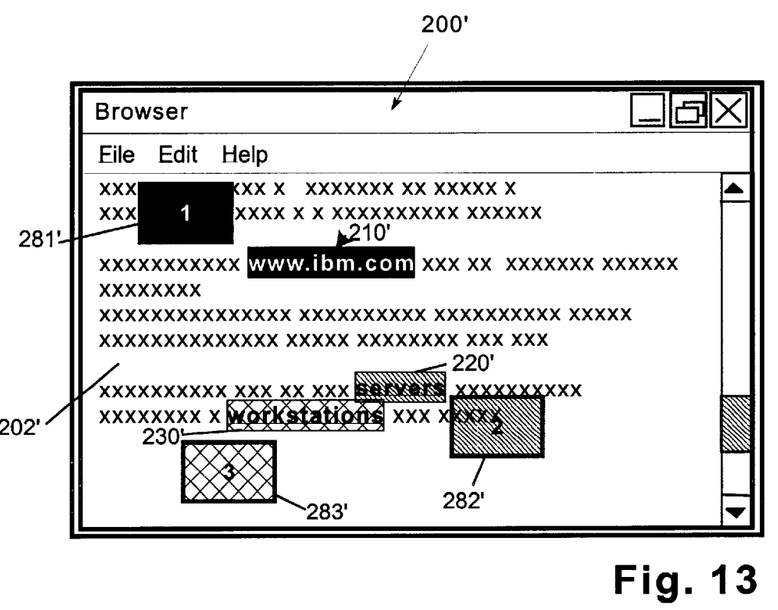
FIG. 13 is a block diagram illustrating a second exemplary hypertext document displayed in a window on the computer system of FIG. 1 after touch screen assist has modified the display.

Referring to FIG. 13, a second illustrative embodiment is shown of displaying opaque floating navigable buttons 281'–283'wherein each button 281'–283' is adjacent the associated primary input region 210', 220', 230', respectively.

Figure 14:
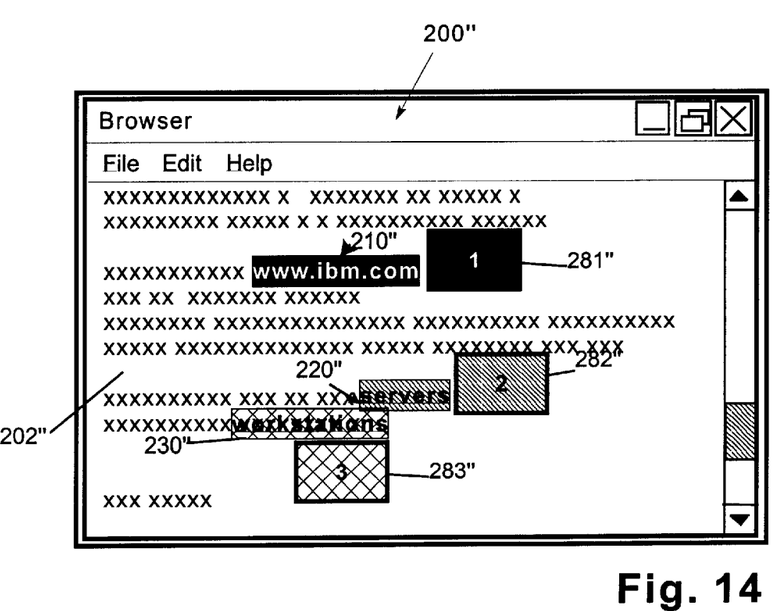
FIG. 14 is a block diagram illustrating a third exemplary hypertext document displayed in a window on the computer system of FIG. 1 after touch screen assist has modified the display.

Referring to FIG. 14, a third illustrative embodiment is shown wherein the buttons 281"–283" are inserted into the hypertext document so that the buttons 281"–283" do not overlap other items in the document 202". Again, buttons 281"–283" are colored to correspond respectively with input regions 210", 220", 230".

Various modifications may be made to the above-described embodiments without departing from the spirit and scope of the invention. For example, operations other than actuating a hypertext link may be performed in response to user input received while a pointer is disposed within an input region, e g., opening a pop-up menu, among others. In addition, various aspects of the invention may be utilized in conjunction with user interface controls other than hypertext links, e.g., push buttons, pop-up buttons, radio buttons, edit boxes, combo boxes, list boxes, counters, check boxes, and other graphical user interface (GUI) controls known in the art. In particular, the ability to provide secondary operations for additional user interface controls when a pointer is disposed within the input region of one control may provide significant productivity gains, particularly when multiple user interface controls are closely packed together in a particular area of a computer display.

Moreover, it should be appreciated that other user interface devices, including various numbers and combinations of buttons and the like, may be used to initiate predetermined operations consistent with the invention. Furthermore, the boundary of an input region may or may not be displayed on the computer display.

Other modifications will be apparent to one of ordinary skill in the art. Therefore, the invention lies solely in the claims hereinafter appended.

What is claimed is:

1. A method of displaying a hypertext document on a computer display of a computer system, the method comprising:

(a) rendering on the computer display a primary input region for a hypertext link defined in the hypertext document;

(b) in response to first user input received after the primary input region is rendered on the computer display, displaying a supplemental input region associated with the primary input region wherein said supplemental input region is separate from said primary input region; and (c) activating the hypertext link in response to second user input directed to the supplemental input region.

2. The method of claim 1, further comprising:

(d) removing the supplemental input region.

3. The method of claim 1, wherein the supplemental input region is visually paired with the primary input region by a shared unique color.

4. The method of claim 1, wherein the supplemental input region includes a navigable button.

5. The method of claim 4, wherein the navigable button is visually paired with the primary input region by adjacent placement.

6. The method of claim 5, wherein displaying the supplemental input region further includes locally modifying the hypertext document by inserting the navigable button adjacent the primary input region.

7. The method of claim 1, wherein the first user input includes user selection of a control displayed on the computer display.

8. The method of claim 1, wherein the first user input is directed within the primary input region and a second primary input region for a second hypertext link defined in the hypertext document.

9. The method of claim 1, wherein the first user input includes a touch screen input.

10. The method of claim 1, wherein the first user input is directed outside of the primary input region.

11. The method of claim 1, wherein a plurality of primary input regions are displayed for a corresponding plurality of hypertext links defined in the hypertext document, and wherein the displaying the supplemental input region further includes:

(i) for each primary input region, determining the shortest distance to the touch screen input;

(ii) creating a list of primary input regions within a threshold distance from the touch screen input; and (iii) displaying a supplemental input region for each primary input region in the list.

12. An apparatus comprising:

(a) a memory; and (b) a program resident in the memory, the program configured to generate display representation data for a primary input region of a hypertext link defined in a hypertext document; to generate display representation data for a supplemental input region associated with the primary input region in response to first user input received after display representation data for the primary input region is generated wherein said supplemental input region is separate from said primary input region; and to activate the hypertext link in response to second user input directed to supplemental input region.

13. The apparatus of claim 12, wherein the program is further configured to maintain an input region linked data structure for the primary input region.

14. The apparatus of claim 12, wherein the first user input is directed outside of the primary input region.

15. The apparatus of claim 12, wherein the first user input is directed within the primary input region and a second primary input region for a second hypertext link defined in the hypertext document.

16. The apparatus of claim 15, wherein the first user input includes a touch screen input.

17. A program product comprising:

(a) a program configured to generate display representation data for a primary input region of a hypertext link defined in a hypertext document; to generate display representation data for a supplemental input region associated with the primary input region in response to user input received after display representation data for the primary input region is generated, wherein said supplemental input region is separate from said primary input region; and to activate the hypertext link in response to user input directed to supplemental input region; and (b) a signal bearing media bearing the program.

18. The program product of claim 17, wherein the signal bearing media is transmission type media.

19. The program product of claim 17, wherein the signal bearing media is recordable media.

20. A method of displaying a hypertext document on a computer display of a computer system, the method comprising:

(a) rendering on the computer display a plurality of primary input regions for a plurality of hypertext links defined in the hypertext document;

(b) in response to user input directed to a position on the computer display, determining which of the plurality of primary input regions is within a threshold distance from the position of the user input, and displaying a supplemental input region for each such primary input region that is within the threshold distance; and (c) activating a hypertext link among the plurality of hypertext links in response to user input directed to the supplemental input region associated with the primary input region for the hypertext link.

21. A method of displaying a hypertext document on a computer display of a computer system, the method comprising:

(a) receiving a hypertext document from a source that is remote to the computer system, the hypertext document including a hypertext link for which a primary input region is defined when the hypertext document is rendered on a computer display;

(b) rendering at least a portion of the hypertext document on the computer display, including rendering the primary input region for the hypertext link on the computer display;

(c) displaying a supplemental input region associated with the primary input region on the computer display, wherein the supplemental input region is not defined in the hypertext document that is received from the source that is remote to the computer system and wherein said supplemental input region is separate from said primary input region; and (d) activating the hypertext link in response to user input directed to the supplemental input region.

22. The method of claim 21, wherein displaying the supplemental input region includes locally modifying the hypertext document to define the supplemental input region therein.

* * * * *